United States Patent [19]

Watanabe et al.

[11] Patent Number: 5,448,386
[45] Date of Patent: Sep. 5, 1995

[54] OPTICAL LIQUID CRYSTAL ELEMENT

[75] Inventors: Hiroshi Watanabe, Yawata; Nobuyasu Yamagishi; Kazuo Yokoyama, both of Hirakata, all of Japan

[73] Assignee: Matsushita Electric Industrial Co., Ltd., Osaka, Japan

[21] Appl. No.: 89,609

[22] Filed: Jul. 12, 1993

Related U.S. Application Data

[63] Continuation of Ser. No. 770,156, Oct. 3, 1991, abandoned, which is a continuation of Ser. No. 430,615, Oct. 31, 1989, abandoned.

[30] Foreign Application Priority Data

Nov. 4, 1988 [JP] Japan .................. 63-278711
Mar. 29, 1989 [JP] Japan .................. 1-78845

[51] Int. Cl.⁶ .................................. G02F 1/13
[52] U.S. Cl. ............................... 359/73; 359/63
[58] Field of Search .......... 350/335, 337, 339 R; 359/73, 63

[56] References Cited

U.S. PATENT DOCUMENTS

| | | | |
|---|---|---|---|
| 4,852,976 | 8/1989 | Suzuki | 350/337 |
| 4,877,309 | 10/1989 | Takamatsu | 350/337 |
| 4,936,654 | 6/1990 | Suzaki et al. | 350/337 |

FOREIGN PATENT DOCUMENTS

| | | |
|---|---|---|
| 60-202423 | 10/1985 | Japan . |
| 63-271415 | 11/1988 | Japan . |
| 2028527 | 3/1980 | United Kingdom . |
| 2171549 | 8/1986 | United Kingdom . |

*Primary Examiner*—Sara W. Crane
*Assistant Examiner*—Courtney A. Bowers
*Attorney, Agent, or Firm*—Stevens, Davis, Miller & Mosher

[57] ABSTRACT

An electro-optic element, such as a liquid crystal, exhibits optical rotatory dispersion and includes a pair of phase difference films which have generally orthogonal stretching axes and are disposed between a pair of polarizing plates. The stretching axis directions of the phase difference films and the transmission axis directions of the polarizing plates are arranged relative to the molecular orientation of the surfaces of the liquid crystal cell to achieve an increase in the angle of visibility, an increase in contrast and improvements in color tones.

9 Claims, 12 Drawing Sheets

OPTICAL LIQUID CRYSTAL ELEMENT

This application is a continuation of application Ser. No. 07/770,156, filed Oct. 3, 191 (abandoned) which is a continuation of application Ser. No. 07/430,615, filed Oct. 31, 1989 (abandoned).

BACKGROUND OF THE INVENTION

This invention relates generally to electro-optic elements constructed of twisted nematic liquid crystals and, more particularly, to optical liquid crystal elements, having improved contrast and visibility angle characteristics relative to electro-optic elements constructed of nematic liquid crystals with twisted arrangements Electro-optic elements having a structure in which an electro-optic effect type liquid crystal panel is interposed between a pair of polarizing plates are known. For instance one such element is a twist-nematic mode (TN mode) using a nematic liquid crystal with molecular orientation twisted 90°, or having a super twist-nematic mode (STN mode) using nematic liquid crystal with molecular orientation twisted by an angle equal to or greater than 90° but smaller than 360°.

Specifically, when such an electro-optic element is used as a direct-vision display device, visibility angle characteristics, such as contrast and color tones are inferior compared to CRTs widely used. This is considered a drawback of the liquid crystal display device.

Figure 1:
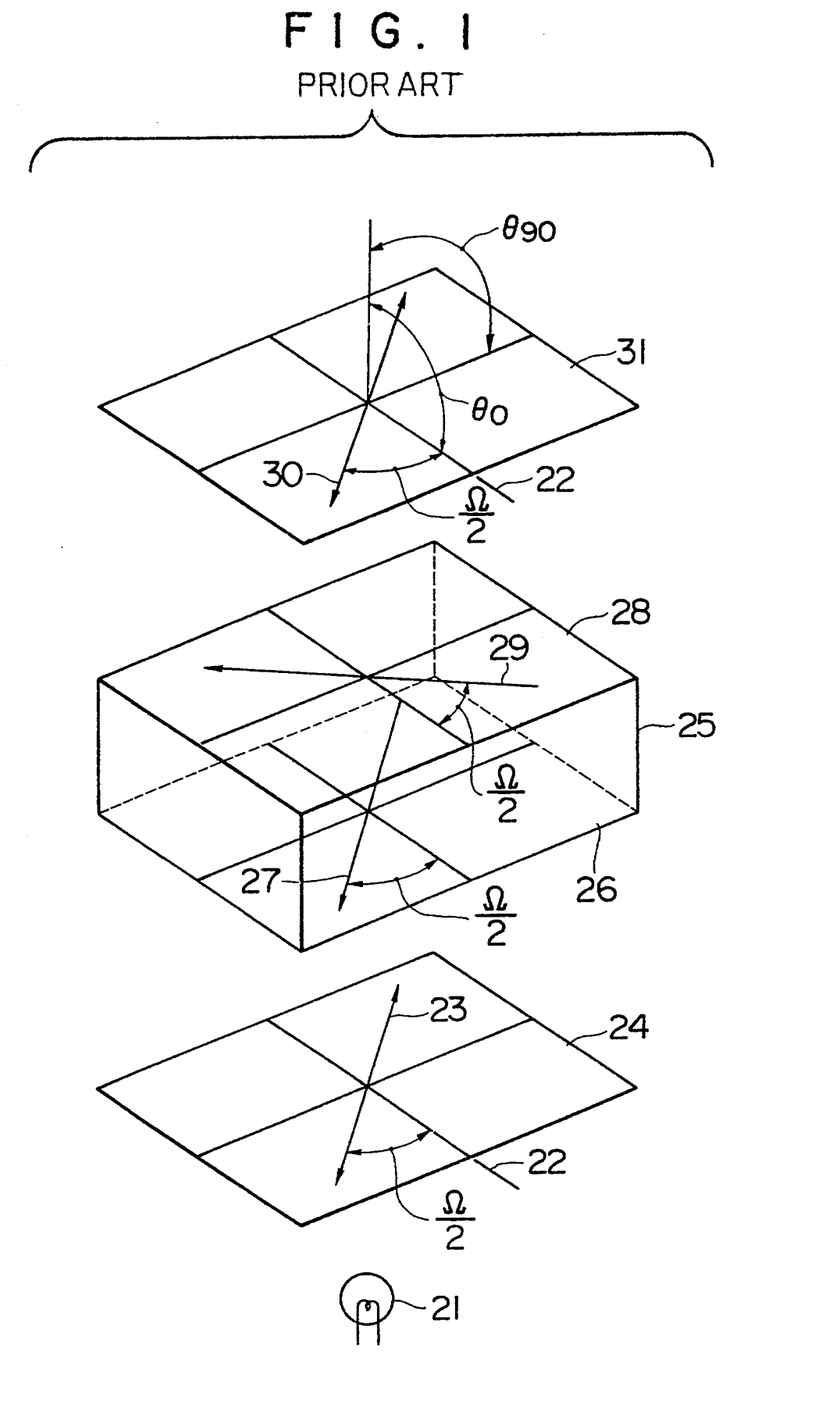
FIG. 1 is an exploded perspective view illustrating a TN-mode electro-optic element in which polarizing plates are positioned in a parallel-Nicols state.
Figure 2A:
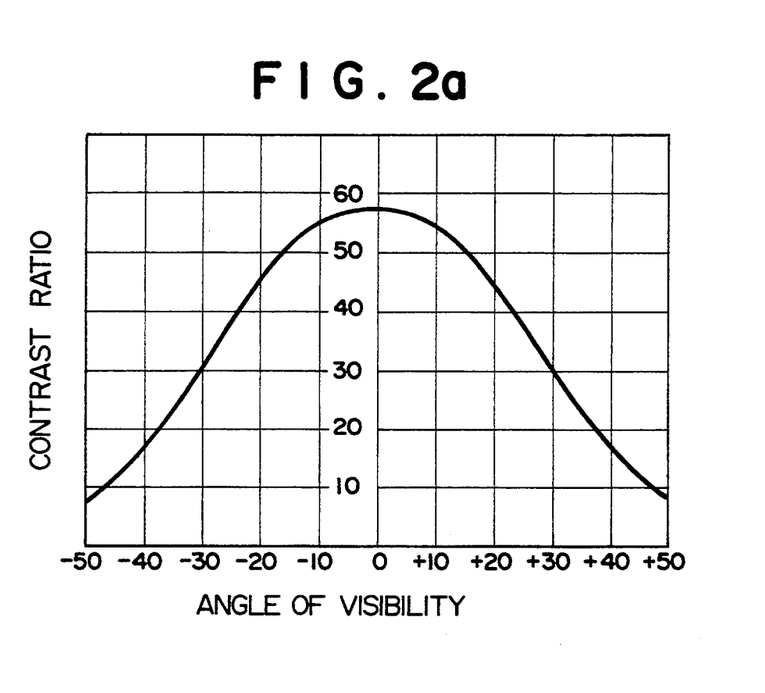
FIGS. 2a to 2c are graphs showing the visual angle dependency and color characteristics on CIE color coordinates of the optical element respectively.
Figure 2B:
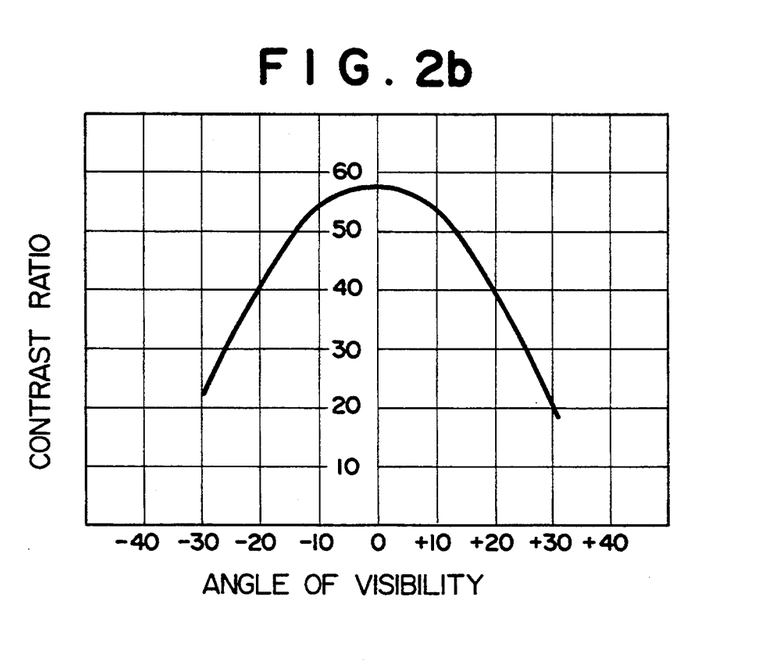
Figure 2C:
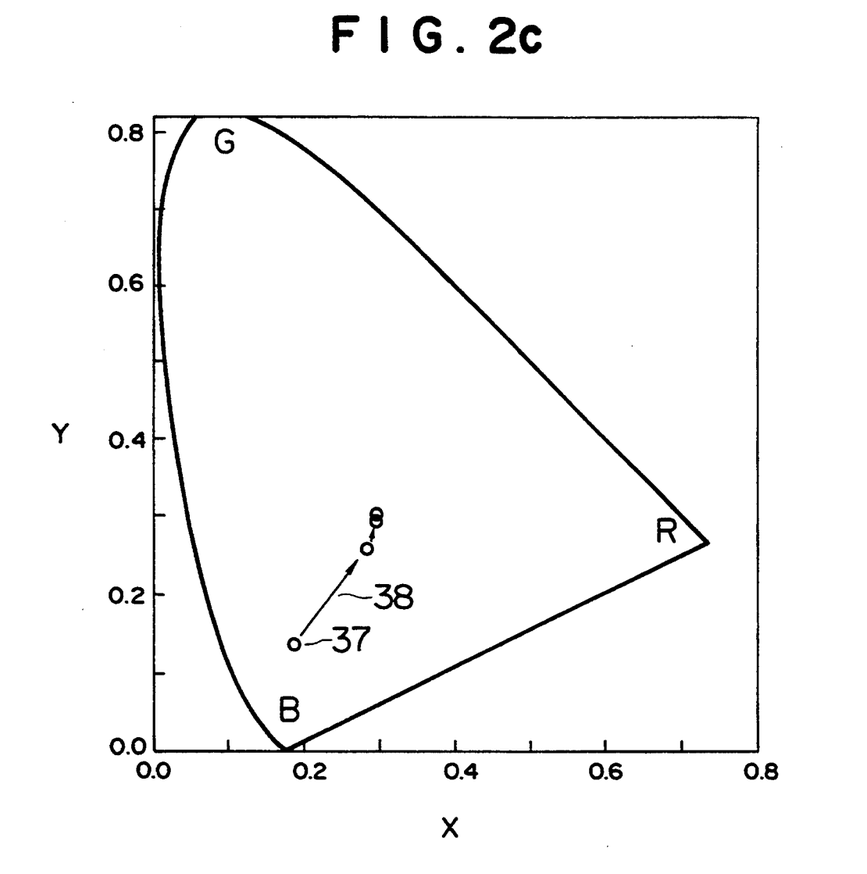

FIG. 1 schematically shows the construction of a conventional TN-mode electro-optic element of a normally black display type in which having axes extended in the same direction polarizing plates to give a parallel-Nicols state and which shuts off light at the time of de-energization. This Figure also shows the relationship between the orientation of the liquid crystal panel and the directions of the transmission axes of the polarizing plates. Light from a light source 21 passes thorough a polarizing plate 24 having a transmission axis 23 at an angle of $\Omega/2$ to a reference line 22 normal to the transmission axis 23 of the display surface and changes into light linearly polarized in this direction and to be incident upon a TN cell 25. The inner surface of a lower substrate 26 of the TN cell is rubbed for orientation in a $\Omega/2$ direction indicated by the arrow 27 while the inner surface of an upper substrate 28 is rubbed for orientation in a direction 29 intersecting the former at an angle of $\Omega$. The light introduced into the TN cell 25 travels therethrough while rotating the plane of polarization by an angle of $\Omega$, and thereafter emerges out of the TN cell. During de-energization of the TN cell 25, the illumination light is shut off by a polarizing plate 31 having a transmission axis 30 perpendicular to the plane of polarization of the emergent light. If a voltage is applied to the TN cell 25 so that the molecular orientation of the liquid crystal becomes perpendicular to the substrate surface, the above-mentioned rotation of the linearly polarized light is cancelled, thereby enabling transmission of the light through the polarizing. The value of this voltage is selected to change the quantity of light passing through the TN cell. FIGS. 2a to 2c show the display characteristics of this conventional construction The character of this construction is $\Omega = 90°$, and the product of the refractive index anisotropy $\Delta n$ (about 0.093) and the thickness d (about 5 nm) of the TN cell is $\Delta n \cdot d = 470$ nm. FIG. 2a shows a visual angle dependency of the contrast in the horizontal direction of the TN cell of the above-described construction, FIG. 2b shows a visual angle dependency in the vertical direction, and FIG. 2c shows coordinates representing display color tones with voltage application and with not voltage application.

Optical liquid crystal elements of this conventional construction entail the following drawbacks. First, regarding the frontal characteristics, the black display in a normally black construction during the applied with voltage application is colored in the case of TN-mode or STN mode liquid crystal elements. This phenomenon has been found in several models. Ordinarily, if linearly polarized light is introduced into a TN-mode or STN-mode liquid crystal panel, elliptically polarized light emerges. If in this case the transmission axes of the polarizing plates and the orientation of the liquid crystal cell are determined the emergent light is turned into linearly polarized light in a certain direction with respect to almost all wavelengths, thereby avoiding the problem. However, light actually passing through the liquid crystal is visible light having a wavelength range of about 400 to 700 nm. In particular, in this wavelength range, blue light having a wavelength of about 450 nm and red light having a wavelength of about 610 nm emerge in elliptically polarized states. This is because the polarized state of the light varies with respect to the wavelength due to the influence of the optical rotatory dispersion in the liquid crystal, i.e., variations in optical rotatory power with respect to different wavelengths. Under this influence, a small amount of blue and red light comes through the TN cell when the voltage is withdrawn for the black display, and the display color is not black but purplish. Referring to the CIE color coordinates shown in FIG. 2c, a color coordinate point 37 greatly deviated from the center at the time the voltage is withdrawn. The arrow 38 on the coordinates indicates a change in the color tone as the voltage is applied to the TN cell. In the case of the STN-mode liquid crystal cell, the optical rotatory dispersion is large compared with the TN mode cell and the display blue or yellow. The problem of this coloring, due to the optical rotatory dispersion, is particularly considerable in the case of STN-mode liquid crystal panels having a large twist angle of 270° which possess a large degree of coloring. To avoid this problem, a method of using a liquid crystal cell for optical rotatory dispersion compensation and a method of disposing at least two phase elements (Japanese Patent Unexamined Publication No.63-271415) has been proposed. However, the former entails problems such as an increase in the production cost, a decrease in the accuracy of the gap between the two cells and a reduction in the transmittance since it utilizes two liquid crystal cells. The latter does not sufficiently reduce the degree of coloring and reductions in the contrast and the transmittance also occur. On the other hand, recently, the industry has received demands for improvements in direct vision type full-color TVs utilizing TN liquid crystal cells and liquid crystal projection type TVs having specifically, improved image qualities. The problem of coloring due to optical rotatory dispersion is considerable in this field. For color display liquid crystal panels, a method has been proposed in which the thicknesses of the liquid crystal layers for R/G/B pixels are optimized with respect to the wavelengths of the respective colors to compensate for the optical rotatory dispersion (Japanese Patent Laid-Open No.60-202423). However, this method is difficult in terms of manufacture, i.e., in obtaining a difference in level and requires optimization of the optical system in its entirety, and is not suitable for achieving a desired contrast while avoiding coloring.

Second, these types of optical liquid crystal elements have a visibility angle dependency. That is, as the angle of visibility is increased, the contrast becomes lower and the color tone changes, resulting in the deterioration of the image. This is because the elliptically polarized components of the emergent light change with and increase in the angle of visibility, so that light comes through a liquid crystal display panel in the shut off state if the display is viewed obliquely, and because coloring due to the optic rotatory dispersion takes place together with this phenomenon to change the contrast and the color tone with the angle of visibility. Such contrast and color characteristics in arbitrary three-dimensional directions can be calculated and predicted by a numerical analysis based on, for example, Berreman 4×4 matrix method with a three-dimensional model of liquid crystal arrangements in the liquid crystal cell, and then the optical design of the liquid crystal panel can be determined on the basis of the results of this calculation. Thus, it is generally considered that the optical characteristics of the liquid crystal cell essentially relate to the visibility angle dependency. In the case of examples of the visibility angle dependency shown in FIGS. 2a and 2b, the contrast ratio is lower than 30 at an angle of 30° both in the horizontal direction and in the vertical direction.

SUMMARY OF THE INVENTION

An object of the present invention is to provide a novel optical liquid crystal element free from the above-described problems.

According to the present invention, two phase different films are disposed generally orthogonal to each other, and the stretching axes of these phase different films, the transmission axes of the polarizing plates and optical axes in the oriented liquid crystal molecules are set so as to establish a specific relationship therebetween.

DESCRIPTION OF THE PREFERRED EMBODIMENTS

Embodiments of the present invention will be described below. FIGS. 3 to 11 relate to embodiments of the present invention.

Figure 3A:
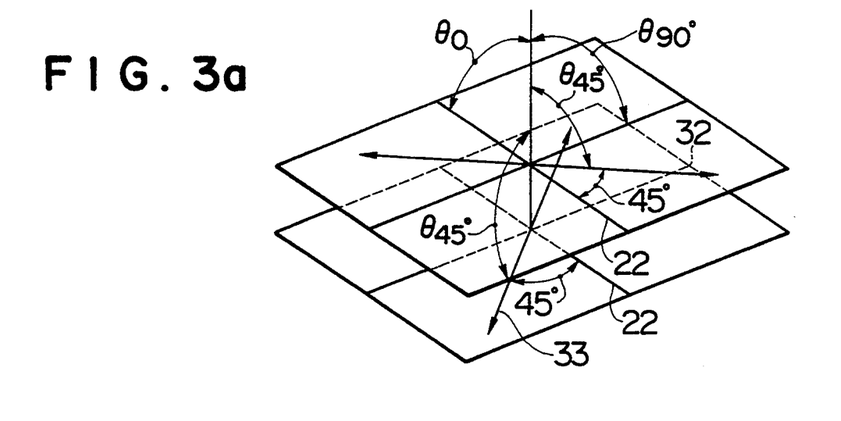
FIG. 3a is a view showing the disposition of polarizing plates with the transmission axes of the polarizing plates positioned in an orthogonal-Nicols state.
Figure 3B:
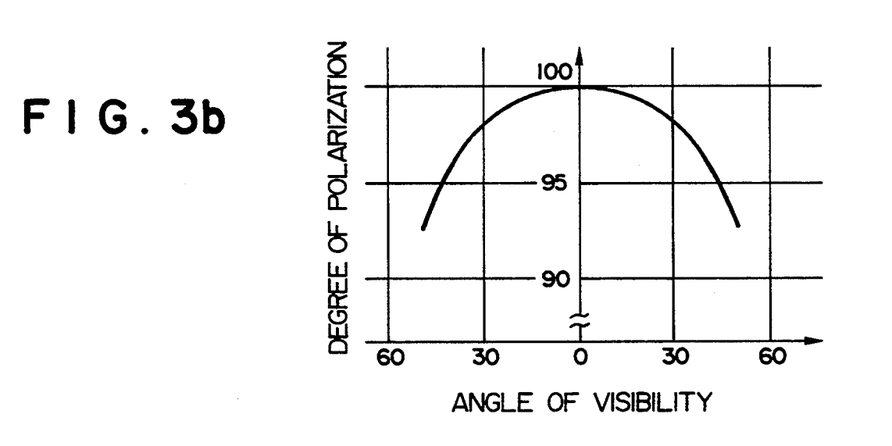
FIGS. 3b and 3c are graphs showing the visibility angle dependency of the degree of polarization in a $\theta_{90}$ direction (with the angle of visibility beingincreased from a line in a direction perpendicular to a reference line 22) and in a $\theta_{45}$ direction (with the angle of visibility being increased in the direction of the transmission axis) when the transmission axes of the polarizing plates are laid in a crossed-nicols state.
Figure 3C:
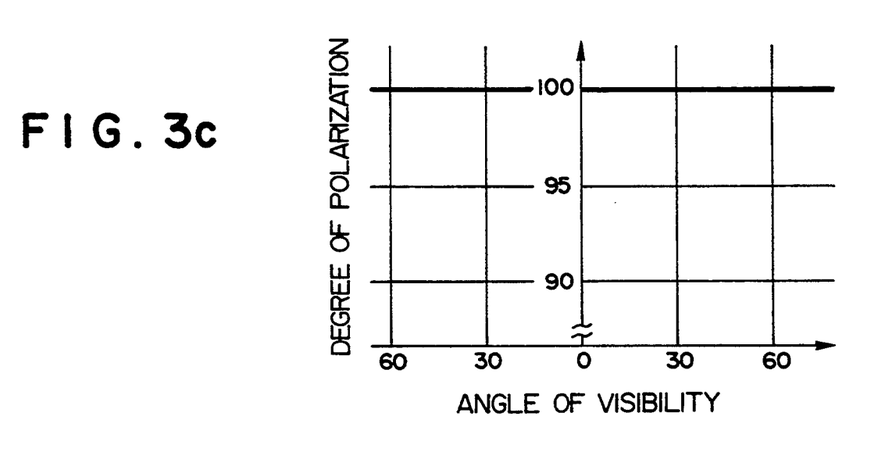
Figure 4A:
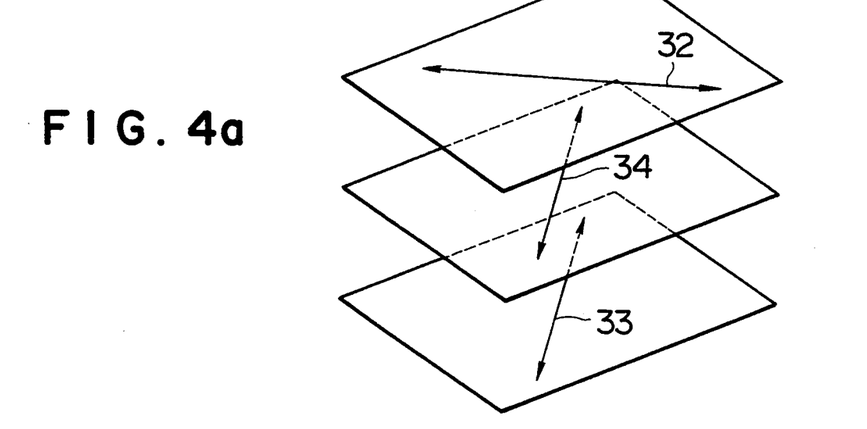
FIG. 4a is a view showing the disposition of a pair of polarizing plates with a phase film interposed therebetween.
Figure 4B:
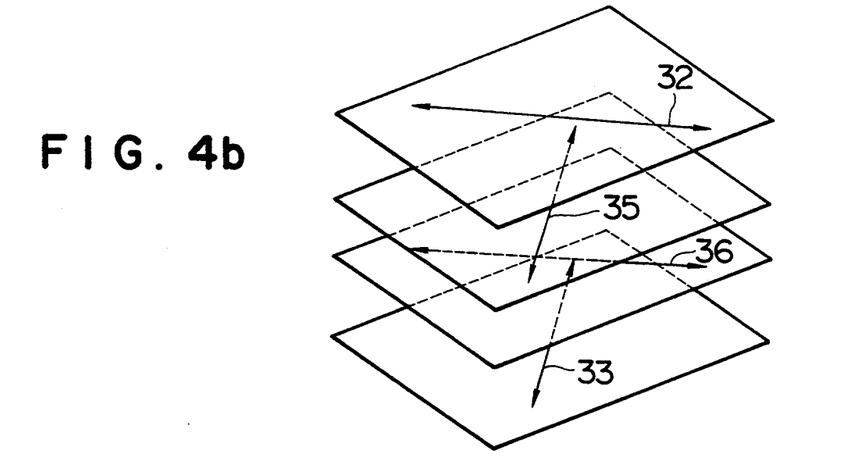
FIG. 4b is a view showing the disposition of a pair of polarizing plates with two phase films interposed therebetween.
Figure 4C:
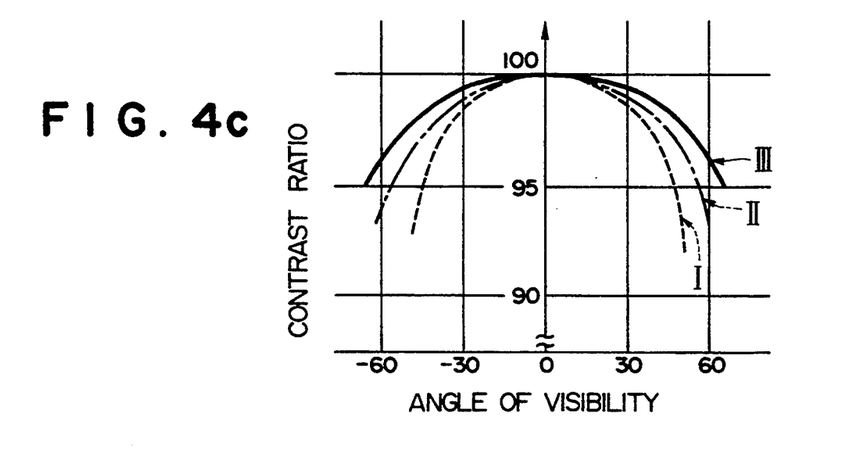
FIG. 4c is a graph showing the visibility angle dependency of the degree of polarization in the visibility angle $\theta_{90}$ direction obtained by the arrangements shown in FIGS. 4a and 4b.

Although it is generally said that the visibility angle dependency of a liquid crystal panel is based on the optic rotatory dispersion in the liquid crystal, the present invention is applied to a liquid crystal panel in view of the fact that the visibility angle dependency due to optical characteristics of the polarizing plates alone is large, and in view of the finding that this dependency can be reduced by the effect of phase films, as described below. FIG. 3a shows the arrangement of polarizing plates alone, with the transmission axes 32 and 33 of the polarizing plates disposed in an orthogonal-Nicols state. FIG. 3b shows the visibility angle dependency of the degree of polarization in a $\theta_{90}$ direction (with the angle of visibility increased in a direction at a right angle to a reference line 22 from a line perpendicular to the panel plane in a direction perpendicular to a reference line 22), and FIG. 3c shows the visibility angle dependency of the degree of polarization in a $\theta_{45}$ direction (with the angle of visibility being increased in the direction of the transmission axis from the line perpendicular to the panel plane. The degree of polarization referred to herein is defined as $$\frac{T|| - T\bot\theta}{T|| + T\bot\theta} \times 100 \ (\%)$$

where $T||$ represents the transmittance in the direction perpendicular to the polarizing plates having their transmission axes disposed in a parallel-Nicols state, and $T\bot\theta$ represents the transmittance in an arbitrary direction toward the polarizing plates having their transmission axes positioned in an orthogonal-Nicols state. Referring to FIG. 3c, the degrees of visibility angle dependency in the polarization axis direction at $\theta_{45}$ and $\theta_{-45}$ are substantially naught, and the optical shielding performance is high in the orthogonal Nicols state, while the degrees of visibility angle dependency in the $\theta_0$ and $\theta_{90}$ directions at angles of 45° to the polarization axis are large and a large leakage of light in an oblique direction can be observed. In contrast, if as shown in FIG. 4a one phase difference film is inserted between the pair of polarizing plates such that the direction 34 of the stretching axis of the phase film and the transmission axis 32 of one of the polarizing plates cross each other at right angles, the visibility angle dependency of the degree of polarization in the visibility angle $\theta_{90}$ direction can be reduced, as indicated by a curve II in FIG. 4c. In FIG. 4c, a curve I indicates the visibility angle dependency in the case where no phase difference film is inserted. If as shown in FIG. 4b a pair of phase difference films are disposed between the pair of polarizing plates such that the stretching axis of each phase film and the corresponding transmission axes 32 or 33 of the adjacent polarizing plate cross each other at right angles, the visibility angle dependency of the degree of polarization in the visibility angle $\theta_{90}$ direction can be reduced as indicated by a curve III in FIG. 4c.

Embodiment 1

Figure 5:
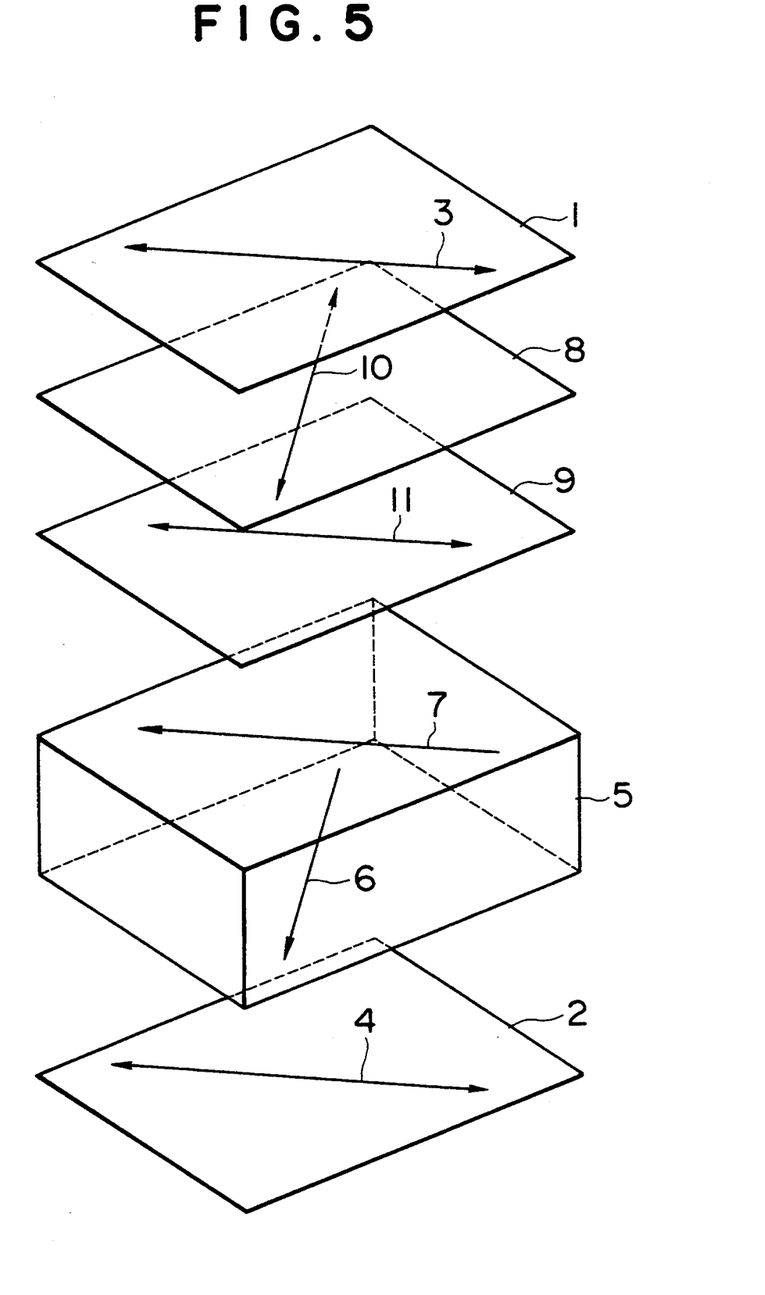
FIG. 5 is an exploded view illustrating an electro-optical optical liquid crystal element in a first embodiment of the present invention.

Referring then to FIG. 5, the present invention based on this principle is applied to an electro-optic element of a nematic liquid crystal panel. That is, a normally black display type electro-optic element is provided in which a pair of polarizing plates 1 and 2 have transmission axes 3 and 4 disposed in a parallel-Nicols state, and a 90° TN cell 5 is interposed between the polarizing plates. The TN cell 5 has at its lower surface an orientation corresponding to the direction of an arrow 6 crossing at right angles the transmission axis 4 of the polarizing plate 2 facing the lower surface of the TN cell, while having at its upper surface another orientation corresponding to the direction of an arrow 7 crossing the direction of the arrow 6 at right angles. The orientation axis 3 of the polarizing plate 1 and the orientation 7 of the upper surface of the TN cell are parallel to each other. A pair of phase films 8 and 9 having stretching axes 10 and 11 crossing each other at right angles are interposed between the polarizing plate 1 and the TN cell such that the orientation 7 is parallel to the stretching axis 11 of the phase difference film adjacent to the TN cell. (The phase difference films 8 and 9 are formed by stretching for example, polycarbonate or polyvinyl alcohol film.) The transmission axis 3 of the upper polarizing plate 1 crosses at right angles the stretching axis 10 of the phase difference film 8 adjacent to the upper polarizing plate 1.

The pair of phase difference films 8 and 9 having the orthogonal stretching axes function such that if the product of refractive index anisotropy $\Delta n$ and the thickness d of the film, $\Delta n \cdot d$, is constant, light introduced in the vertical so as direction undergoes double refraction in the first layer so as to be changed in the phase and is thereafter reversely changed in the phase in the second layer, thereby restoring the original state. Apparently the light passing though the phase difference films 8 and 9 is not changed. That is, even if the pair of phase difference films 8 and 9 are inserted, the frontal characteristics are not changed or the change can be minimized. If the positional relationship between the pair of phase difference films 8 and 9, the liquid crystal cell and the polarizing plates are determined in accordance with this constructions, the visibility angle characteristics can be improved without changing the frontal characteristics.

Figure 6A:
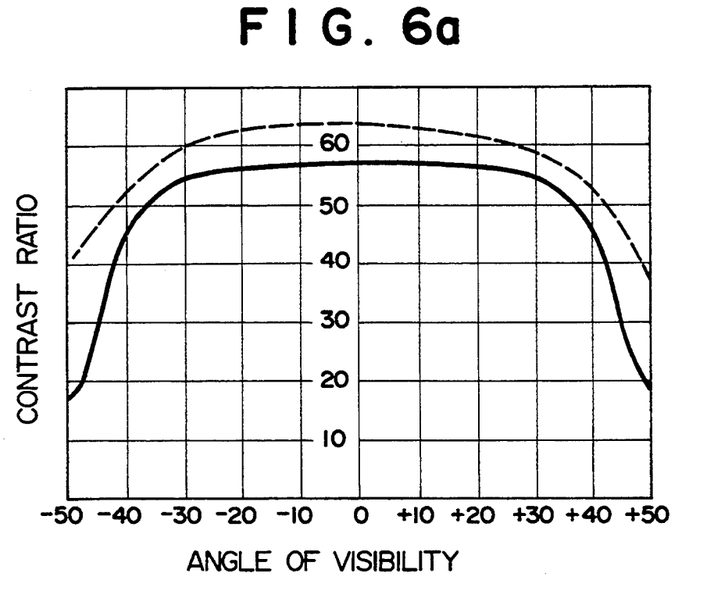
FIGS. 6a and 6b are graphs respectively showing the visibility angle dependency of the first embodiment as shown in FIG. 5, and the visibility angle dependency in the of the second embodiment shown in FIG. 7.
Figure 6B:
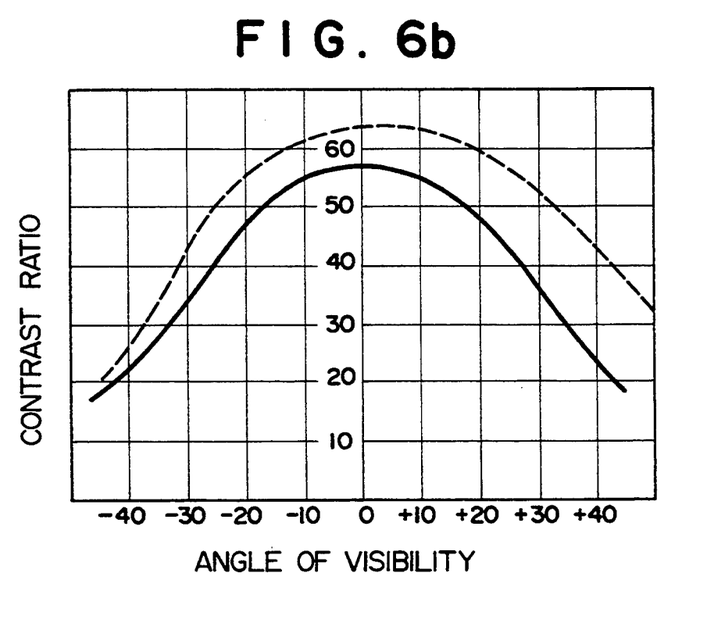

Solid lines in FIG. 6a and 6b indicate the visibility angle dependency characteristics in the horizontal and vertical directions in a case where the liquid crystal cell explained above as the conventional element shown in FIG. 4 is used as the TN cell, that is, a liquid crystal panel having a nematic liquid crystal of a twist angle of 90° in which the product of refractive index anisotropy $\Delta n$ and the thickness d of the cell, $\Delta n \cdot d = 470$ nm, is used, two phase difference films in which the product of refractive index anisotropy $\Delta n$ and the thickness d of the film $\Delta n \cdot d = 300$ nm are used, and these components are disposed in accordance with the above construction. The definition of $\theta_0$ and $\theta_{90}$ is the same as the case relating to FIGS. 3a to 3c. As is apparent from FIGS. 6a and 6b, the angle of visibility is increased both in the horizontal direction and in the vertical direction as compaired with the characteristics of the conventional liquid display panel shown in FIGS. 2a and 2b. However, it has been considered that the insertion of phase difference films of this embodiment tends to entail some bad influence, that is, may reduce the transmittance and change the color tone. The applicants conducted experiments to ascertain the effect to this influence. That is, the spectral transmittance in the frontal direction of an electro-optic element having the construction in accordance with this embodiment was measured during the application of a voltage. It was confirmed that the angle of visibility was increased in oblique directions while the transmittance characteristics and the color tone characteristics with respect to the frontal direction were substantially equal to the frontal characteristics based on the conventional construction even though the subject construction included the pair of phase films.

The construction shown in FIG. 5 ensures the same effect both in the case where illumination light is first introduced into the polarizing plate 2 and the display is viewed on the side of the polarizing plate 1 and in the case where illumination light is first introduced into the polarizing plate 1 and the display is viewed on the side of the polarizing plate 2, and a construction obtained by inverting the construction of FIG. 5 is also effective.

Embodiment 2

Figure 7:
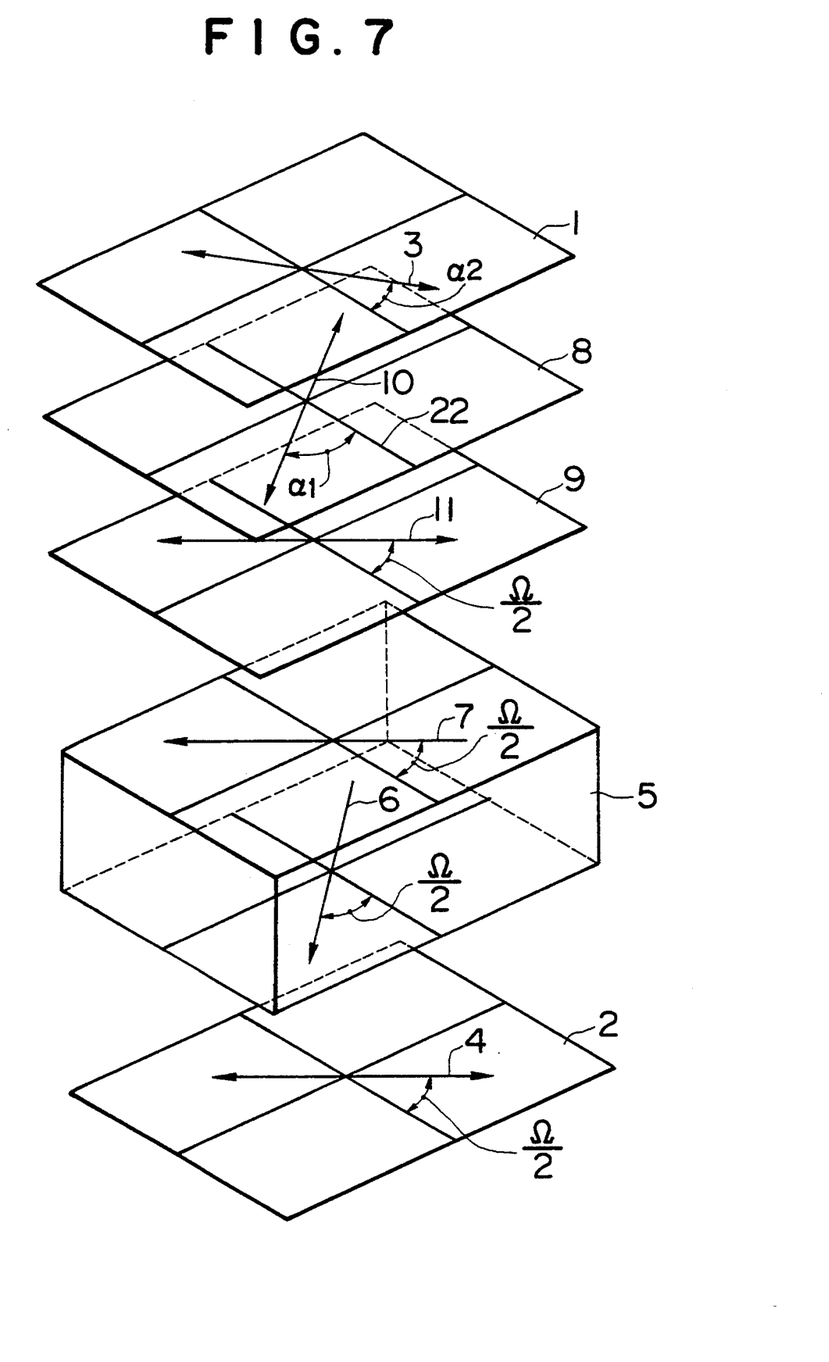
FIG. 7 is a diagram of the construction of an electro-optic liquid crystal element in a second embodiment of the present invention.
Figure 8:
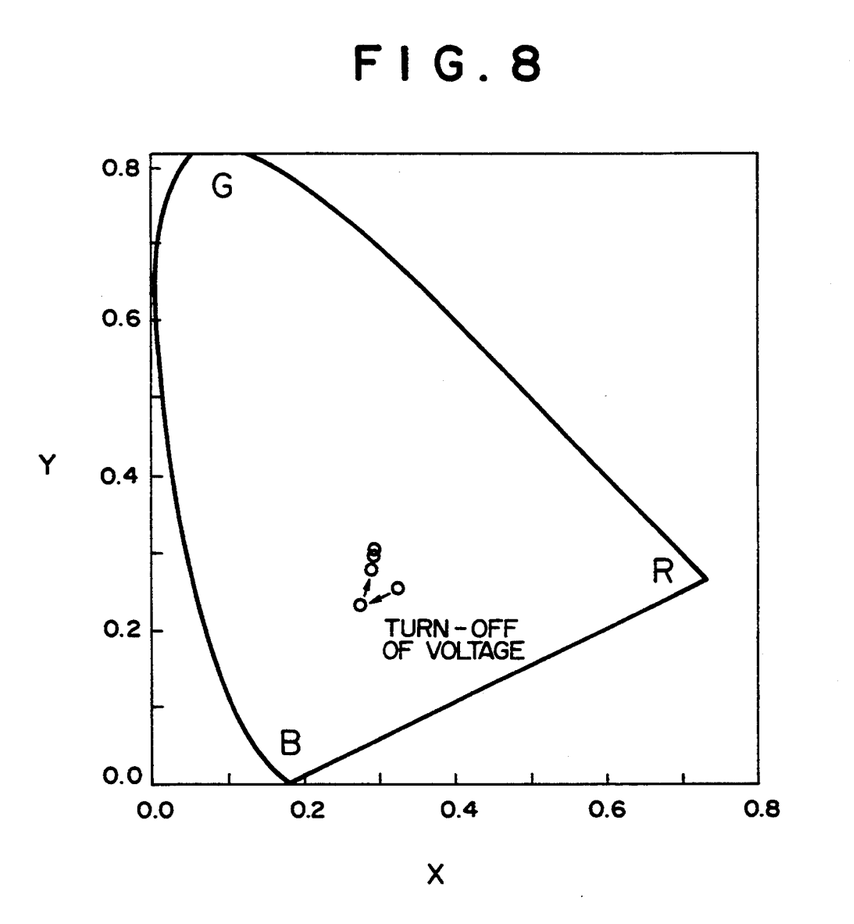
FIG. 8 is a graph showing the color tone characteristics of the construction shown in FIG. 7 on CIE color coordinates based on the construction shown in FIG. 7.

FIG. 7 shows a perspective view of an electro-optic element which represents a second embodiment of the present invention. The construction of the first embodiment is provided mainly for the purpose of increasing the angle of visibility, but the construction shown in FIG. 7 has additional effects, as described below. The upper polarizing plate 1, the phase difference film adjacent to the upper polarizing plate 1 and the phase difference film 9 are positioned by shifting their axes by angles $\alpha 1$ and $\alpha 2$. The color of black display that have tended to be bluish or purplish when the voltage is not applied is thereby blackened deeply and the contrast is also improved while the desired effect of increasing the angle of visibility is maintained. In this case, the angle $\alpha 1$ is set to $\Omega/2+6$ degrees to the reference line 22 on the phase difference film 9 adjacent to the TN cell 5, and $\alpha 2$ is set to $\Omega/2-15$ degrees. Broken lines in FIGS. 6a and 6b indicate the resulting characteristics. As is apparent from these graphs, the contrast is improved as compared with the characteristics (solid line) based on the construction of the first embodiment. FIG. 8 shows color tone characteristics on CIE color coordinates based on the construction of the second embodiment. All color coordinates during periods of applied voltage and during periods of no applied voltage are closer to the center, which shows that the degree of coloring is very small. If an error in the setting of the angles $\alpha 1$ and $\alpha 2$ are within a range of $\pm 20°$, the resulting changes in the characteristics of the electro-optic element are negligible. However, if the error exceeds the limit, the phase difference films have a composite uniaxial optical anisotropy such that the characteristics of display seen from a position in front of the electro-optic element are changed, resulting in deteriorations in the characteristics, e.g., a reduction in the contrast and coloring.

Embodiment 3

Figure 9:
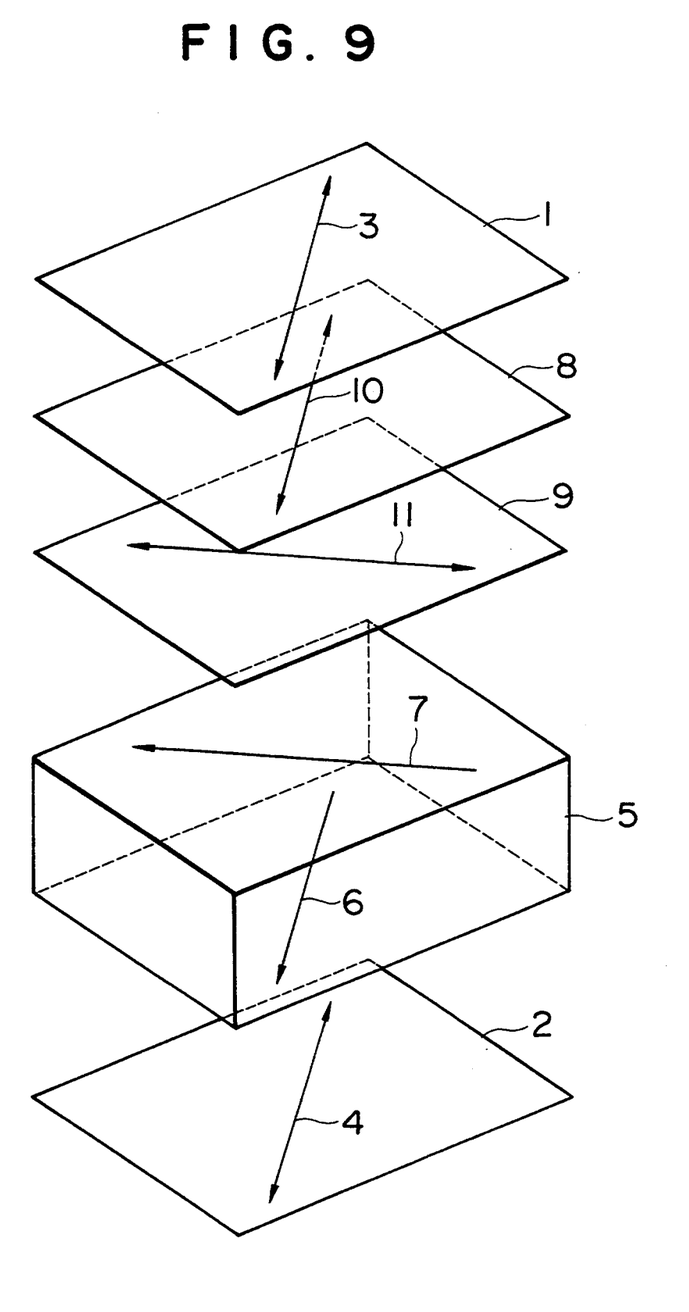
FIGS. 9 and 10 exploded perspective view illustrating of electro-optic elements in other embodiments of the present invention.

FIG. 9 shows a perspective view of an electro-optic element which represents a third embodiment of the present invention. This embodiment differs from the first embodiment in that the transmission axis 3 of the polarizing plate 1 and stretching axis 10 of the phase difference film 8 adjacent to the polarizing plate 1 are not orthogonal but parallel to each other. It was confirmed that a normally-black display type of TN cell having this construction had the same features as those mentioned above with respect to the first embodiment. However, the change in the color tone viewed in an oblique direction is slightly larger than that in the case of the first embodiment. That is, as a result, the arrangement in which the transmission axis of the polarizing plate and the stretching axis of the adjacent film cross generally at right angles to each other is effective in reducing changes in spectral characteristics of light leakage seen in an oblique direction in order to limit coloring. In this embodiment also, a construction obtained by inverting the construction shown in FIG. 9 is effective just as in the first embodiment.

Embodiment 4

Figure 10:
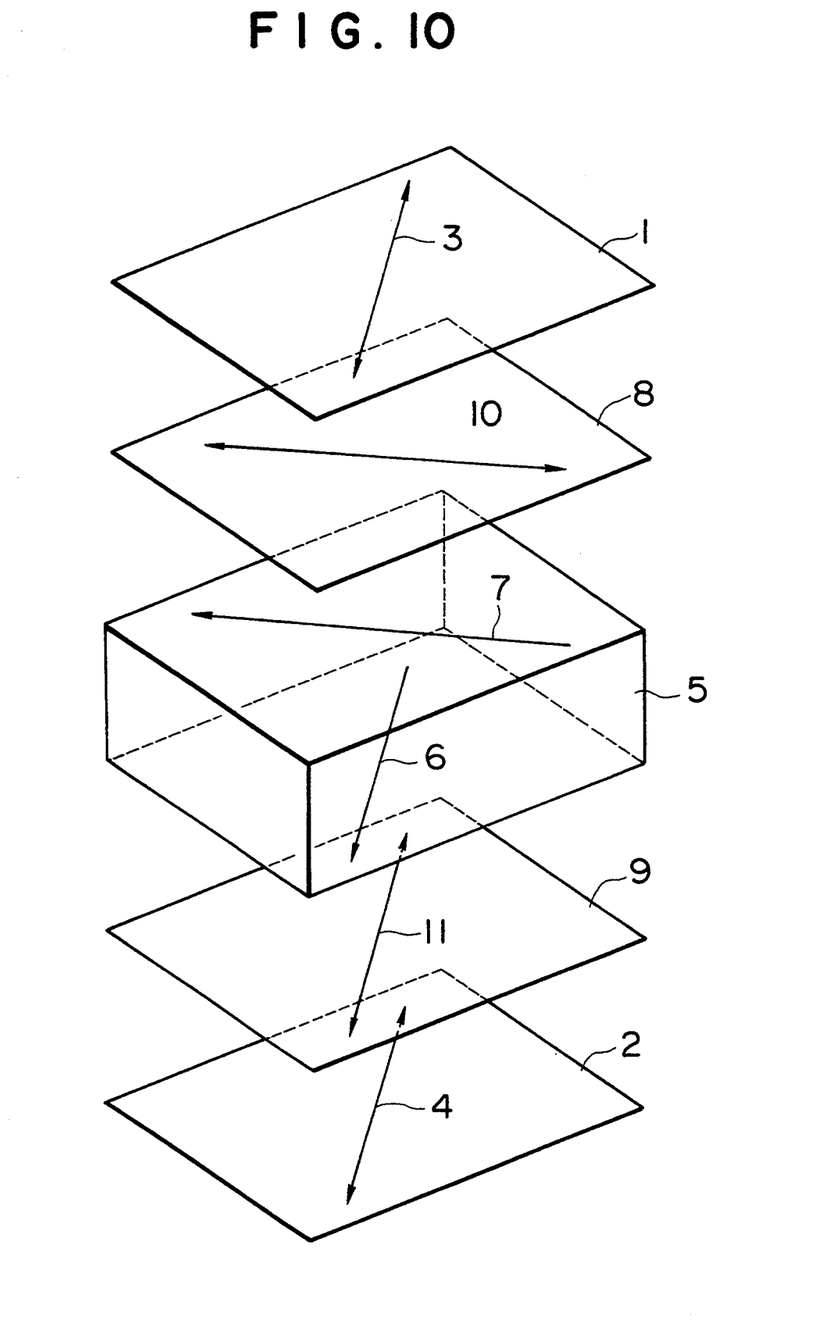

FIG. 10 shows a perspective view of an electro-optic element which represents a fourth embodiment of the present invention and in which the pair of orthogonal phase films 8 and 9 are separately disposed on the opposite sides of the TN cell 5. The upper-side orientation 7 of the TN cell 5 is parallel to the stretching axis 10 of the phase difference film 8 adjacent to the upper surface of the TN cell. Similarly, the lower-side orientation 6 of the TN cell 5 is parallel to the stretching axis 11 of the phase difference film 9 adjacent to the lower surface of the TN cell. It was confirmed that a normally-black display type of TN cell having this construction had the same features as the first embodiment. However, the change in the color tone viewed in an oblique direction is slightly larger than that in the first embodiment, as in the case of the third embodiment. In this embodiment also, a construction obtained by inverting the construction shown in FIG. 10 is effective.

Embodiment 5

Figure 11:
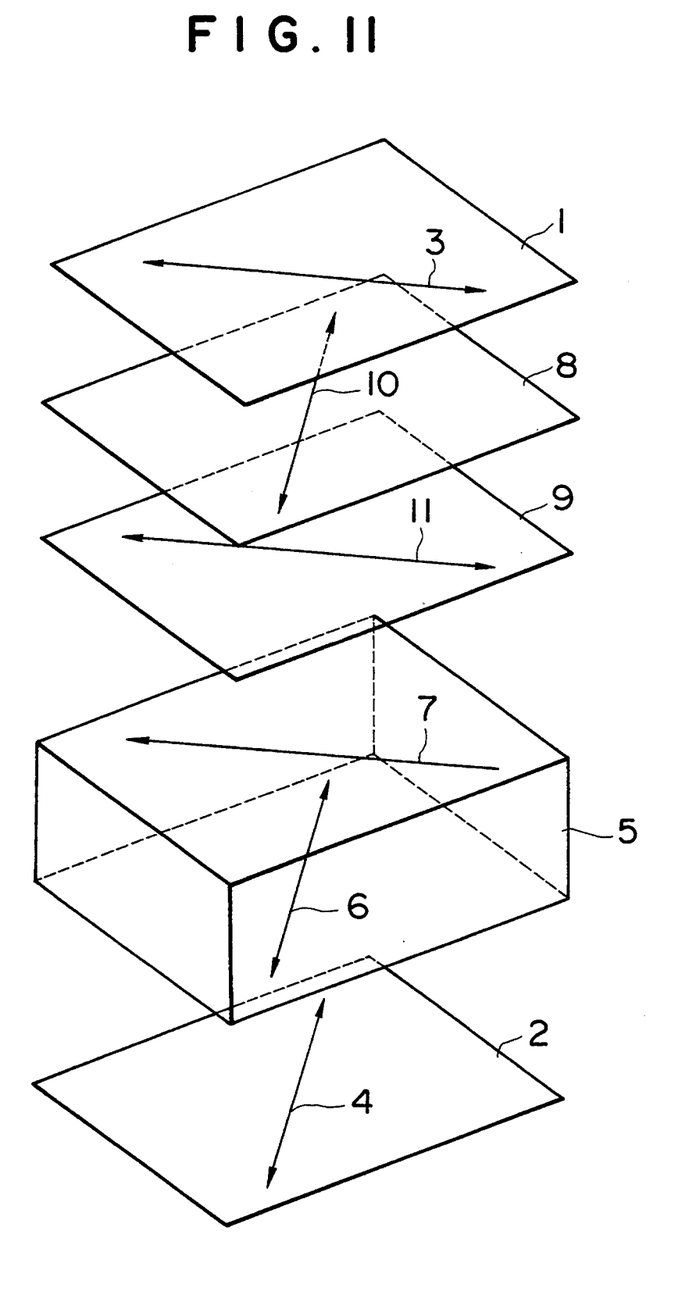
FIG. 11 is a perspective view illustrating an embodiment of the present invention using a normally white display type TN cell with two polarizing plates disposed in an orthogonal-Nicols state.

FIG. 11 shows a normally white display type TN cell using two polarizing plates disposed in an orthogonal-Nicols state unlike the first to fourth embodiments. In this fifth embodiment, only the direction of the transmission axis 4 of the polarizing plate 2 is different as compared to the construction shown in FIG. 5. In this case also, the same features as those of the construction of FIG. 5 were recognized. In the case of the conventional electro-optic element of this display mode, the range of the angle of visibility in the vertical direction is particularly restricted, and there is a possibility of occurrence of inversion of the image. In this embodiment, however, the visibility angle ranges of the contrast and the color tone are greatly improved and the possibility of inversion of the image is limited.

Other Embodiments

For realization of the construction of the present invention, a composite film composed of a polarizing plate and a phase difference film can be used, in a further embodiment of the present invention. That is, composite films in each of which the transmission axis of a polarizing layer and the stretching axis of a phase difference layer are generally orthogonal or parallel to each other are combined to form an electro-optic element having the construction in accordance with the present invention. In a further embodiment phase difference sheets having a pair of generally orthogonal stretching axes are attached to one face of a polarizing layer so that the transmission axis of the polarizing layer and one of the stretching axes cross each other at right angles to construct an electro-optic element. It is possible to simplify the process of manufacturing electro-optic elements by using these composite films.

It is also possible to use these composite films as substrates for a liquid crystal panel to construct an electro-optic element. This method of ensures reductions in the overall thickness and the weight of the panel, which is advantageous in terms of portability, particularly when the display panel is used in a portable display device.

Further, the present invention can be applied to a type a construction in which an optical isomer is provided between a pair of polarizing plates separately from a pair of phase difference films. The optical isomer may be a nematic liquid crystal which has a twist angle generally equal to that of the liquid crystal cell but has an opposite twisting direction. An electro-optic element having this two-layer structure was manufactured by using such a nematic liquid crystal while making the product of refractive index anisotropy $\Delta n$ and the cell thickness d thereof, $\Delta n \cdot d$ equal to that of the liquid crystal cell. As a result, the effects of the present invention were also recognized. Electro-optic elements having this type of two-layer structure are adopted for, in particular, improvements in the color tone characteristics when viewed from the frontal direction, i.e., for improvements in visibility by whitening or blackening the background color. In this type of electro-optic element, however, the visibility angle dependency of each of the contrast and the color tone have been sacrifed. In contrast, the present invention improves the visibility angle characteristics without impairing the frontal direction display characteristics, thereby solving this problem.

In the above description, the application of the present invention to color-display electro-optic elements is not mentioned, but the present invention is specifically effective when applied to electro-optic elements for full-color image display which incorporate switching devices and have a combination of a multiplicity of pixels and R/G/B color filters. The present invention is more effective when applied to color projection TVs having R/G/B liquid crystal layers because the wavelength range of light introduced into each liquid crystal cell is limited and is narrower than the visible light range.

In accordance with the present invention, as described above, the directions of the stretching axes of the pair of generally orthogonal phase films, the orientations of the liquid crystal and the directions of the transmission axes of the polarizing plates are positioned in an optimum relationship, thereby enabling electro-optic liquid crystal elements of TN mode, STN mode, two-layer TN mode, two-layer STN mode, and so on to be remarkably improved in visibility angle characteristics without causing any considerable loss in the transmittance by the insertion of phase plates. At the same time, the contrast and the color tones are also improved. In addition, to achieve improvements in image quality of large size display of projection TVs or the like using liquid crystal cells, the present invention makes use of phase difference films to achieve an improvement in the contrast even with oblique lighting, thereby reducing the cost and size of the display system as well as improving the image quality.

What is claimed is:

1. An electro-optic element comprising:

a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction and said first and second molecular orientation directions each making an angle of approximately 45° relative to a vertical direction, during use, of a display surface of the electro-optic element;

a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, said first polarizing plate having a first transmission axis and said second polarizing plate having a second transmission axis, and said first transmission axis being oriented approximately parallel to said second transmission axis and to said first molecular orientation direction; and a first phase difference film and a second phase difference film both disposed between said first polarizing plate and said first surface of said liquid crystal cell and each having a stretching axis, said second phase difference film being arranged adjacent to said first surface of said liquid crystal cell and said first phase difference film being positioned adjacent to said first polarizing plate, said stretching axes of said first and second phase difference films being approximately orthogonal to each other, wherein said stretching axis of the second phase difference film is approximately parallel with the first molecular orientation direction of the liquid crystal cell and said stretching axis of said first phase difference film is approximately orthogonal to said first transmission axis of said first polarizing plate.

2. An electro-optic element according to claim 1, wherein said phase difference films respectively have products $\Delta n_1 \cdot d_1$, $\Delta n_2 \cdot d_2$ which are equal to each other, where $\Delta n_1$ and $\Delta n_2$ are refractive index anisotropies of said phase difference films, and $d_1$ and $d_2$ are thicknesses of said phase difference films.

3. An electro-optic element according to claim 1, wherein one of said polarizing plates is integrally incorporated with both of said phase difference films so as to form a composite film.

4. An electro-optic element according to claims 3, wherein said composite film is used as a substrate of said liquid crystal cell.

5. An electro-optic element comprising:

a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction and said first and second molecular orientation directions each making an angle of approximately 45° relative to a vertical direction, during use, of a display surface of the electro-optic element;

a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, said first polarizing plate having a first transmission axis and said second polarizing plate having a second transmission axis, and said first transmission axis being oriented approximately parallel to said second transmission axis and to said second molecular orientation direction; and a first phase difference film having a first stretching axis and being disposed between said first polarizing plate and said first surface of said liquid crystal cell and a second phase difference film having a second stretching axis and being disposed between said second polarizing plate and said second surface of said liquid crystal cell, said first and second stretching axes being approximately orthogonal to each other, wherein said first stretching axis is approximately parallel with the first molecular orientation direction of the liquid crystal cell and said second stretching axis is approximately parallel to said second molecular orientation direction of the liquid crystal cell.

6. An electro-optic element comprising:

a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction;

a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, and said first polarizing plate having a first transmission axis and said second polarizing plate having a second transmission axis which is approximately parallel to said first transmission axis; and a first phase difference film and a second phase difference film both disposed between said first polarizing plate and said first surface of said liquid crystal cell and each having a stretching axis, said second phase difference film being arranged adjacent to said first surface of said liquid crystal cell and said first phase difference film being positioned adjacent to said first polarizing plate, said stretching axes of said first and second phase difference films being approximately orthogonal to each other, wherein said stretching axis of the second phase difference film is approximately parallel with the first molecular orientation direction of the liquid crystal cell.

7. An electro-optic element comprising:
a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction;
a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, and said first polarizing plate having a first transmission axis and said second polarizing plate having a second transmission axis which is approximately parallel to said first transmission axis; and
a first phase difference film having a first stretching axis and being disposed between said first polarizing plate and said first surface of said liquid crystal cell and a second phase difference film having a second stretching axis and being disposed between said second polarizing plate and said second surface of said liquid crystal cell, said first and second stretching axes being approximately orthogonal to each other,
wherein said first stretching axis is approximately parallel with the first molecular orientation direction of the liquid crystal cell and said second stretching axis is approximately parallel to said second molecular orientation direction of the liquid crystal cell.

8. An electro-optic element comprising:
a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction and said first and second molecular orientation directions each making an angle of approximately 45° relative to a vertical direction, during use, of a display surface of the electro-optic element;
a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, said first polarizing plate having a first transmission axis and said second polarizing plate having a second transmission axis, and said first transmission axis being oriented approximately parallel to said second transmission axis and approximately orthogonal to said first molecular orientation direction; and
a first phase difference film and a second phase difference film both disposed between said first polarizing plate and said first surface of said liquid crystal cell and each having a stretching axis, said second phase difference film being arranged adjacent to said first surface of said liquid crystal cell and said first phase difference film being positioned adjacent to said first polarizing plate, said stretching axes of said first and second phase difference films being approximately orthogonal to each other,
wherein said stretching axis of the second phase difference film is approximately parallel with the first molecular orientation direction of the liquid crystal cell and said stretching axis of said first phase difference film is approximately parallel to said first transmission axis of said first polarizing plate.

9. An electro-optic element comprising:
a nematic liquid crystal cell including a first surface in which molecules are oriented in a first molecular orientation direction and a second surface which is parallel to said first surface and in which molecules are oriented in a second molecular orientation direction, said first molecular orientation direction being approximately orthogonal to said second molecular orientation direction and said first and second molecular orientation directions each making an angle of approximately 45° relative to a vertical direction, during use, of a display surface of the electro-optic element;
a first polarizing plate and a second polarizing plate having said liquid crystal cell interposed therebetween, said first polarizing plate being positioned adjacent said first surface of said liquid crystal cell and said second polarizing plate being positioned adjacent said second surface of said liquid crystal cell, said first polarizing plate having a first transmission axis and said second polarizing plate having a second transmission axis, and said first transmission axis being oriented approximately orthogonal to said second transmission axis and approximately parallel to said first molecular orientation direction; and
a first phase difference film and a second phase difference film both disposed between said first polarizing plate and said first surface of said liquid crystal cell and each having a stretching axis, said second phase difference film being arranged adjacent to said first surface of said liquid crystal cell and said first phase difference film being positioned adjacent to said first polarizing plate, said stretching axes of said first and second phase difference films being approximately orthogonal to each other,
wherein said stretching axis of the second phase difference film is approximately parallel with the first molecular orientation direction of the liquid crystal cell and said stretching axis of said first phase difference film is approximately orthogonal to said first transmission axis of said first polarizing plate.

* * * * *